United States Patent [19]

Fukuya

[11] Patent Number: 5,625,801

[45] Date of Patent: Apr. 29, 1997

[54] METHOD AND APPARATUS FOR PRODUCING STANDARDIZED SOFTWARE SPECIFICATIONS AND SOFTWARE PRODUCTS

[75] Inventor: Akiko Fukuya, Dazaifu, Japan

[73] Assignees: Hitachi, Ltd., Tokyo; Hitachi Software Engineering Co., Ltd., Yokohama, both of Japan

[21] Appl. No.: 281,566

[22] Filed: Jul. 28, 1994

[30] Foreign Application Priority Data

Aug. 5, 1993 [JP] Japan ..................... 5-194553

[51] Int. Cl.$^6$ ............................. G06F 9/455
[52] U.S. Cl. .................................. 395/500
[58] Field of Search ................... 395/500, 650, 395/600

[56] References Cited

U.S. PATENT DOCUMENTS

| | | | |
|---|---|---|---|
| 4,833,641 | 5/1989 | Lerner | 395/650 |
| 4,967,348 | 10/1990 | Naito et al. | 395/600 |
| 5,305,450 | 4/1994 | Naito et al. | 395/500 |

OTHER PUBLICATIONS

A Total Approach to a Solution for the Maintenance Problems Through Configuration Management—Maintenance Support Facility MSF, IEEE 1983.

Software Reuse Trends in the United States, IEEE 1991.

Tools to Rejuvenate Your Old Systems, EDP Analyzer 1994.

Software Maintenance: The Need for Standardization, IEEE 1989.

*Primary Examiner*—Kevin J. Teska
*Assistant Examiner*—Dan Fiul
*Attorney, Agent, or Firm*—Antonelli, Terry, Stout & Kraus, LLP

[57] ABSTRACT

A method and apparatus for producing standardized software specifications and software products involves analyzing an existing software product subject to reuse to produce analysis information. From this analysis information, groups of data mutually having the same contents, and identified as the same meaning data, are detected. Each of the groups is then assigned a standard data name and standard attributes, thus producing standard information. Names of data belonging to the groups of same meaning data in the analysis information are converted into the corresponding standard data names and standard attributes based on the standard information, to produce standard software specifications. A standardized software product is similarly produced based on the standard information.

10 Claims, 11 Drawing Sheets

CONCEPTUAL DIAGRAM SHOWING PRESENT INVENTION

CONCEPTUAL DIAGRAM SHOWING PRESENT INVENTION

HARDWARE ENVIRONMENT

PROCESSING PROCEDURE OF FIRST EMBODIMENT

EXAMPLE OF EXISTING SOFTWARE PRODUCT

FIG.5

EXAMPLE OF RESULTS OF ANALYSIS ON SOFTWARE PRODUCT

RESULT OF ANALYSIS ON JOB CONTROL PROGRAM

| PROGRAM NAME | FILE ALLOCATION NAME | FILE NAME | |
|---|---|---|---|
| P1 | OUTFL | FILE1 | 501 |
| P2 | INFL | FILE1 | 502 |

INFORMATION OF ANALYSIS ON FILE RELATION

| PROGRAM NAME | FILE ALLOCATION NAME | FILE NAME | INPUT/OUTPUT DATA NAME | |
|---|---|---|---|---|
| P1 | OUTFL | OUTFILE | OUTDATA | 503 |
| P2 | INFL | INFILE | INDATA | 504 |

INFORMATION ON ARGUMENTS FOR PROGRAM CALLING

| PROGRAM NAME | NUMBER OF ARGUMENTS | NAME OF ARGUMENTS | |
|---|---|---|---|
| P1 | 0 | | 505 |
| P2 | 0 | | 506 |
| P3 | 1 | PARM-DT | 507 |

CALL INFORMATION

| PROGRAM NAME | NAME OF CALLED PROGRAM | NUMBER OF ARGUMENTS | NAME OF ARGUMENTS | |
|---|---|---|---|---|
| P2 | P3 | 1 | P3-DATA | 508 |

INFORMATION OF ANALYSIS ON GROUP DATA

| PROGRAM NAME | DATA NAME | NAME OF HIGHEST RANK DATA | LEVEL | POSITION | LENGTH | ..... | |
|---|---|---|---|---|---|---|---|
| P1 | OUTDATA | OUTDATA | 01 | 1 | 16 | | 509 |
| P1 | ZAIRYO-MEI | OUTDATA | 02 | 1 | 8 | | 510 |
| P1 | ZOKUSEI | OUTDATA | 02 | 9 | 8 | | 511 |
| P2 | INDATA | INDATA | 01 | 1 | 16 | | 512 |
| P2 | IN-NAME | INDATA | 02 | 1 | 8 | | 513 |
| P2 | IN-ATB | INDATA | 02 | 9 | 8 | | 514 |
| P2 | P2-TBL | P2-TBL | 01 | 1 | 16 | | 515 |
| P2 | WK-NAME | P2-TBL | 02 | 1 | 8 | | 516 |
| P2 | CODE-A | P2-TBL | 02 | 9 | 8 | | 517 |
| P2 | P3-DATA | P3-DATA | 01 | 1 | 16 | | 518 |
| P2 | P3-DATA1 | P3-DATA | 02 | 1 | 8 | | 519 |
| P2 | P3-DATA2 | P3-DATA | 02 | 9 | 8 | | 520 |
| P3 | PARM-DT | PARM-DT | 01 | 1 | 16 | | 521 |
| P3 | PARM-01 | PARM-DT | 02 | 1 | 8 | | 522 |
| P3 | PARM-02 | PARM-DT | 02 | 9 | 4 | | 523 |

FIG.6

EXAMPLE OF PRODUCED SAME MEANING DATA GROUP INFORMATION

| SAME MEANING DATA ID | PROGRAM NAME | DATA NAME | |
|---|---|---|---|
| 001 | P1 | OUTDATA | 601 |
| 001 | P2 | INDATA | 602 |
| 002 | P1 | ZAIRYO-MEI | 603 |
| 002 | P2 | IN-NAME | 604 |
| 003 | P1 | ZOKUSEI | 605 |
| 003 | P2 | IN-ATB | 606 |
| 002 | P2 | WK-NAME | 607 |
| 002 | P2 | P3-DATA1 | 608 |
| 004 | P2 | P3-DATA2 | 609 |
| 004 | P2 | CODE-A | 610 |
| 005 | P2 | P3-DATA | 611 |
| 005 | P3 | PARM-DT | 612 |
| 002 | P3 | PARM-01 | 613 |
| 004 | P3 | PARM-02 | 614 |
| 006 | P2 | P2-TBL | 615 |

FIG.8

EXAMPLE OF PRODUCED STANDARD INFORMATION

| SAME MEANING DATA ID | PROGRAM NAME | DATA NAME | STANDARD DATA NAME | |
|---|---|---|---|---|
| 001 | P1 | OUTDATA | | |
| 001 | P2 | INDATA | | |
| 002 | P1 | ZAIRYO-MEI | ZAIRYO-MEI | 801 |
| 002 | P2 | IN-NAME | ZAIRYO-MEI | 802 |
| 003 | P1 | ZOKUSEI | | |
| 003 | P2 | IN-ATB | | |
| 002 | P2 | WK-NAME | ZAIRYO-MEI | 803 |
| 002 | P2 | P3-DATA1 | ZAIRYO-MEI | 804 |
| 004 | P2 | P3-DATA2 | ZAIRYO-CODE | 805 |
| 004 | P2 | CODE-A | ZAIRYO-CODE | 806 |
| 005 | P2 | P3-DATA | | |
| 005 | P3 | PARM-DT | | |
| 002 | P3 | PARM-01 | ZAIRYO-MEI | 807 |
| 004 | P3 | PARM-02 | ZAIRYO-CODE | 808 |
| 006 | P2 | P2-TBL | | |

ASSIGNMENT OF STANDARD NAME (1)
FIG.7A  STANDARD NAME ASSIGNED TO SAME MEANING DATA GROUP 002
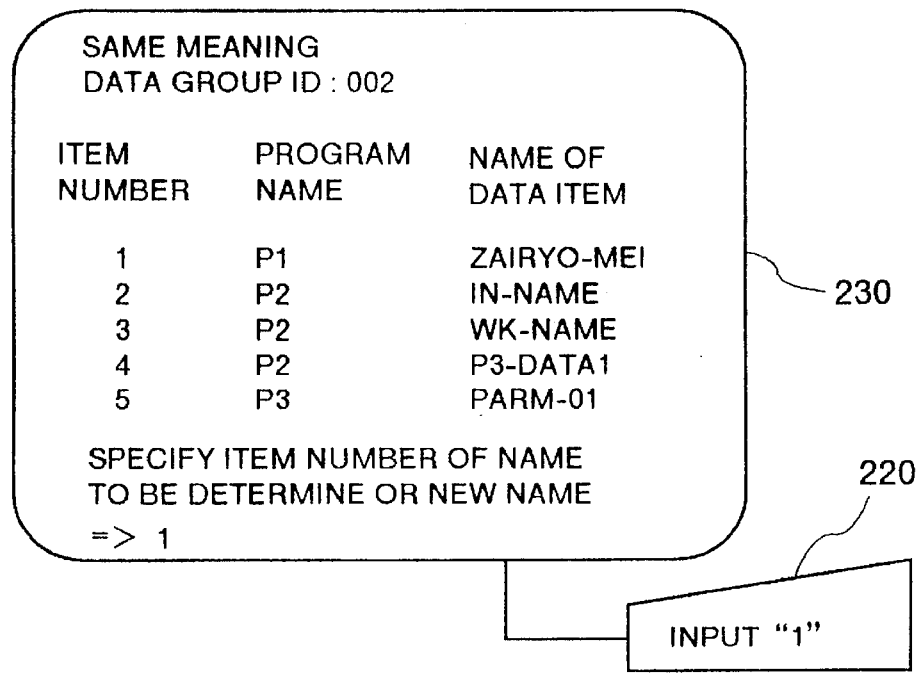
ASSIGNMENT OF STANDARD NAME (2)
FIG.7B  STANDARD NAME ASSIGNED TO SAME MEANING DATA GROUP 004
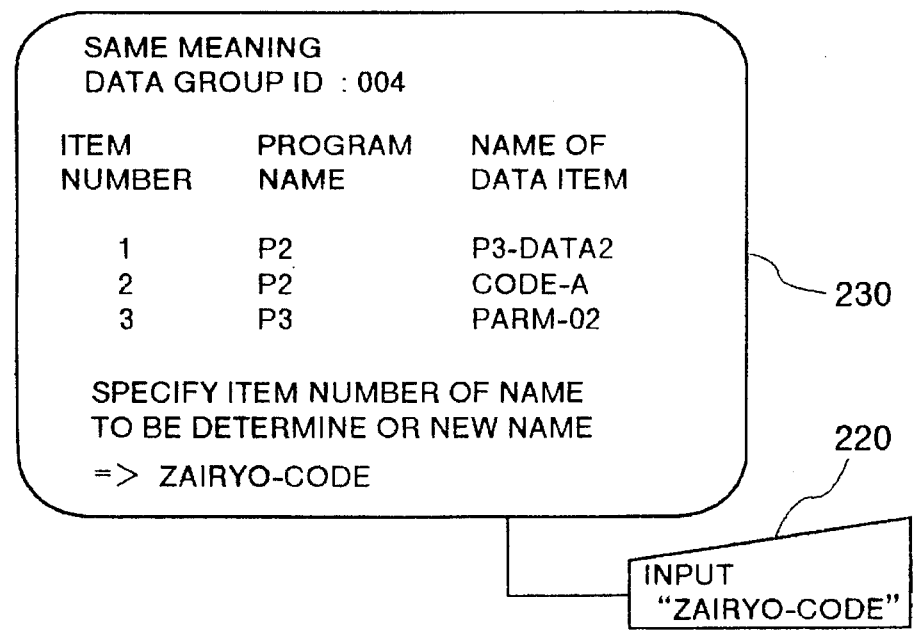

FIG.9

EXAMPLE OF PRODUCED TABLE SPECIFICATIONS

| TABLE NAME | OUTDATA | | | | |
|---|---|---|---|---|---|
| ITEM NUMBER | LEVEL NUMBER | DATA NAME | DATA TYPE | POSITION | LENGTH | ..... |
| 1 | 01 | OUTDATA | | 1 | 16 | | 901 |
| 2 | 02 | ZAIRYO-MEI | X | 1 | 8 | | 902 |
| 3 | 02 | ZOKUSEI | X | 9 | 8 | | 903 |

| TABLE NAME | INDATA | | | | |
|---|---|---|---|---|---|
| ITEM NUMBER | LEVEL NUMBER | DATA NAME | DATA TYPE | POSITION | LENGTH | ..... |
| 1 | 01 | INDATA | | 1 | 16 | | 904 |
| 2 | 02 | ZAIRYO-MEI | X | 1 | 8 | | 905 |
| 3 | 02 | IN-ATB | X | 9 | 8 | | 906 |

| TABLE NAME | P2-TBL | | | | |
|---|---|---|---|---|---|
| ITEM NUMBER | LEVEL NUMBER | DATA NAME | DATA TYPE | POSITION | LENGTH | ..... |
| 1 | 01 | P2-TBL | | 1 | 16 | | 907 |
| 2 | 02 | ZAIRYO-MEI | X | 1 | 8 | | 908 |
| 3 | 02 | ZAIRYO-CODE | X | 9 | 8 | | 909 |

| TABLE NAME | P3-DATA | | | | |
|---|---|---|---|---|---|
| ITEM NUMBER | LEVEL NUMBER | DATA NAME | DATA TYPE | POSITION | LENGTH | ..... |
| 1 | 01 | P3-DATA | | 1 | 16 | | 910 |
| 2 | 02 | ZAIRYO-MEI | X | 1 | 8 | | 911 |
| 3 | 02 | ZAIRYO-CODE | X | 9 | 8 | | 912 |

| TABLE NAME | PARM-DT | | | | |
|---|---|---|---|---|---|
| ITEM NUMBER | LEVEL NUMBER | DATA NAME | DATA TYPE | POSITION | LENGTH | ..... |
| 1 | 01 | PARM-DT | | 1 | 16 | | 913 |
| 2 | 02 | ZAIRYO-MEI | X | 1 | 8 | | 914 |
| 3 | 02 | ZAIRYO-CODE | X | 9 | 8 | | 915 |

☐ : INDICATES THAT STANDARD NAME IS USED

FIG.10

EXAMPLE OF PRODUCED STANDARD INFORMATION

| SAME MEANING DATA ID | PROGRAM NAME | DATA NAME | STANDARD DATA NAME | |
|---|---|---|---|---|
| 001 | P1 | OUTDATA | ZAIRYO-DATA | 1001 |
| 001 | P2 | INDATA | ZAIRYO-DATA | 1002 |
| 002 | P1 | ZAIRYO-MEI | ZAIRYO-MEI | 801 |
| 002 | P2 | IN-NAME | ZAIRYO-MEI | 802 |
| 003 | P1 | ZOKUSEI | ZOKUSEI | 1003 |
| 003 | P2 | IN-ATB | ZOKUSEI | 1004 |
| 002 | P2 | WK-NAME | ZAIRYO-MEI | 803 |
| 002 | P2 | P3-DATA1 | ZAIRYO-MEI | 804 |
| 004 | P2 | P3-DATA2 | ZAIRYO-CODE | 805 |
| 004 | P2 | CODE-A | ZAIRYO-CODE | 806 |
| 005 | P2 | P3-DATA | P3-PARM | 1005 |
| 005 | P3 | PARM-DT | P3-PARM | 1006 |
| 002 | P3 | PARM-01 | ZAIRYO-MEI | 807 |
| 004 | P3 | PARM-02 | ZAIRYO-CODE | 808 |
| 006 | P2 | P2-TBL | P2-TBL | 1007 |

FIG.12

EXAMPLE OF PRODUCED PROGRAM SPECIFICATION

| PROGRAM NAME | P2 | | | |
|---|---|---|---|---|
| INPUT/OUTPUT PARAMETER | NAME | | | |
| | NONE | | | 1201 |
| FILE | FILE NAME | FILE ALLOCATION NAME | RECORD NAME | |
| | INFILE | INFL | ZAIRYO-DATA | 1202 |
| TABLE | NAME | | | |
| | P2-TBL | P3-PARM | | 1203 |
| CALL | CALLED PROGRAM | NAME OF TAKEN-OVER PARAMETER | | |
| | P3 | P3-PARM | | 1204 |
| .... | ..... | | | |

☐ : INDICATES THAT STANDARD INFORMATION IS USED

FIG.11

EXAMPLE OF PRODUCED TABLE SPECIFICATIONS

| TABLE NAME | | ZAIRYO-DATA | | | | | |
|---|---|---|---|---|---|---|---|
| ITEM NUMBER | LEVEL NUMBER | DATA NAME | DATA TYPE | POSITION | LENGTH | ••••• | |
| 1 | 01 | ZAIRYO-DATA | | 1 | 16 | | 1101 |
| 2 | 02 | ZAIRYO-MEI | X | 1 | 8 | | 1102 |
| 3 | 02 | ZOKUSEI | X | 9 | 8 | | 1103 |

| TABLE NAME | | P2-TBL | | | | | |
|---|---|---|---|---|---|---|---|
| ITEM NUMBER | LEVEL NUMBER | DATA NAME | DATA TYPE | POSITION | LENGTH | ••••• | |
| 1 | 01 | P2-TBL | | 1 | 16 | | 1104 |
| 2 | 02 | ZAIRYO-MEI | X | 1 | 8 | | 1105 |
| 3 | 02 | ZAIRYO-CODE | X | 9 | 8 | | 1106 |

| TABLE NAME | | P3-PARM | | | | | |
|---|---|---|---|---|---|---|---|
| ITEM NUMBER | LEVEL NUMBER | DATA NAME | DATA TYPE | POSITION | LENGTH | ••••• | |
| 1 | 01 | P3-PARM | | 1 | 16 | | 1107 |
| 2 | 02 | ZAIRYO-MEI | X | 1 | 8 | | 1108 |
| 3 | 02 | ZAIRYO-CODE | X | 9 | 8 | | 1109 |

PROCESSING PROCEDURE OF SECOND EMBODIMENT

FIG.14

EXAMPLE OF STANDARDIZED SOFTWARE PRODUCT

☐ : REPLACED BY STANDARD NAME

SOURCE PROGRAM P2

```
       :
PROGRAM-ID. P2.
       :
    SELECT INFILE
           ASSIGN TO INFL.
       :
    FD INFILE.
    01 ZAIRYO-DATA.
       02 ZAIRYO-MEI    PIC X(8).
       02 ZOKUSEI       PIC X(8).
       :
    01 P2-TBL.
       02 ZAIRYO-MEI    PIC X(8).
       02 ZAIRYO-CODE   PIC X(8).
       :
    01 P3-PARM.
       02 ZAIRYO-MEI    PIC X(8).
       02 ZAIRYO-CODE   PIC X(8).
       :
    READ INFILE
    MOVE ZAIRYO-MEI
           OF ZAIRYO-DATA
      TO ZAIRYO-MEI
           OF P2-TBL
       :
    MOVE ZAIRYO-MEI
           OF P2-TBL
      TO ZAIRYO-MEI
           OF P3-PARM
    CALL 'P3' USING P3-PARM
    MOVE ZAIRYO-CODE
           OF P3-PARM
      TO ZAIRYO-CODE
           OF P2-TBL
       :
```

SOURCE PROGRAM P1

```
       :
PROGRAM-ID. P1.
       :
    SELECT OUTFILE
           ASSIGN TO OUTFL.
       :
    FD OUTFILE.
    01 ZAIRYO-DATA.
       02 ZAIRYO-MEI    PIC X(8).
       02 ZOKUSEI       PIC X(8).
       :
```

SOURCE PROGRAM P3

```
       :
PROGRAM-ID. P3.
       :
    LINKAGE SECTION.
    01 P3-PARM.
       02 ZAIRYO-MEI    PIC X(8).
       02 ZAIRYO-CODE   PIC X(8).
       :
    PROCEDURE DIVISION
           USING P3-PARM.
       :
```

METHOD AND APPARATUS FOR PRODUCING STANDARDIZED SOFTWARE SPECIFICATIONS AND SOFTWARE PRODUCTS

BACKGROUND OF THE INVENTION

The present invention relates to improvements in software productivity, and more particularly to a software reuse method which utilizes existing software in order to efficiently develop new software.

Methods of improving software productivity may be roughly classified into two types: (1) a method of converting existing software into a standard format which permits such existing software to be readily reused; and (2) a method of converting existing software into specifications which express the same in a readily understandable form.

In the method of converting existing software into a readily reusable standard format, standardization and unification of data items in the existing software are effective. A prior art example of this method is described in JP-A-3-294925, wherein the standardization and unification of data items in existing software are achieved in the following procedure.

First, data having the same contents in programs and job control programs are automatically extracted as same meaning candidates by analyzing data input/output, transfer relation, data structure, and so on. Then, the user confirms data which have the same meaning from the same meaning data candidates to produce same meaning data group information. Next, the user sets standard information to the same meaning data group information by providing the same with a standard name and standard attributes. Finally, corresponding standard information is substituted for names of data in an existing program where the same meaning data is used, thus completing the standardization and unification of data in the existing program.

In the other method, where documents are used to understand a software product, specifications are used for visually expressing the software with tabular and graphical representations. A prior art method of automatically producing specifications complying with the contents of a software product is described, for example, in JP-A-1-237726. According to this method, programs and job control programs are analyzed to produce specification information which should be included in software specifications, and this specification information is converted into a software specification form, thus enabling the software specifications to be produced.

Generally, in an initial stage of software development, the contents of software specifications are consistent with the contents of a software product, however, as modifications are added to the software product, the software specifications may deviate from the modified software product. To solve this problem, JP-A-2-81128, for example, discloses a method of automatically reflecting the latest contents of a software product to its software specifications. This prior art method accomplishes the automatic reflection of the latest changed and modified contents of a source program to table specifications in the following procedure.

Upon changing or modifying, a program or a source program is temporarily stored. The stored source program is edited, and changed and modified parts of the source program are analyzed to produce change and modification information for table definition. Then, a means for relating the program to the table definition is used to make changes and modifications in the previously produced table definition at portions corresponding to the changes and modifications in the program, based on the change and modification information.

If specifications for existing software can be utilized when new software is to be developed, a working amount may be reduced. In this event, unstandardized contents of the existing software should not be utilized without rearrangement, but if they are standardized before being used, software development will be advanced with less works for producing specifications therefor.

In this respect, the above-mentioned prior art method must first standardize a software product and then convert the standardized software product into software specifications, thus presenting a problem that the working efficiency is quite low.

Also, with the prior art method, since the software specifications are required for each of existing software products, a plurality of software specifications having the sane meaning and the same contents may be produced. Therefore, when the software specifications for existing software products are utilized, usable standard specifications must be selected therefrom.

SUMMARY OF THE INVENTION

It is a first object of the present invention to provide efficient techniques for standardizing software products and converting them into software specifications, which enable the software specifications to be directly produced from obtained standard data without replacing data in a software product by the standard data, thus efficiently producing the software specifications using the standard data.

It is a second object of the present invention to reduce the amount of produced specifications and efficiently provide necessary software specifications by designating a standardized data unit as a production unit of the software specifications without using existing software products as the production unit.

It is a third object of the present invention to efficiently produce standardized software products in addition to the production of standardized software specifications.

The above objects are achieved by a method of the present invention which including the steps of: analyzing an existing software product; detecting groups of data which mutually have the same contents and are identified as the same meaning data; determining a standard data name or the standard data name and standard attributes for each of the groups of same meaning data as standard information; converting names of locations at which data belonging to the groups of same meaning data are defined or used in the software product into the determined standard data names or into the determined standard data names and standard attributes; and producing standard software specifications for the existing software product.

The present invention is also characterized in that, when data serving as a unit of producing software specifications are standardized in an existing software product, the standard software specifications are produced in the standard information unit.

During works for reusing existing software in development of new software, the standard information corresponding to data to be set in the specifications can be detected from relations among the results on analysis on existing software products, the same meaning data groups, and the standard information, so that software specifications using standard data can be produced even without standardizing the software products.

Also, when data serving as the unit of producing software specifications have been standardized in existing software products, the software specifications are produced in the standard information unit. Since the standard information generally corresponds to a plurality of existing data, a plurality of existing information are unified such that necessary specifications only may be produced.

Further, by replacing data in existing software products by the standard information, standardized software products can also be produced in addition to the production of he software specifications.

BRIEF DESCRIPTION OF THE DRAWINGS

FIG. 5 shows in a table form the results of analysis on the software product of FIG. 4;

FIG. 6 shows in a table form the results of produced same meaning data group information;

FIGS. 7A and 7B are diagram each showing an example of a procedure for assigning a standard name;

FIG. 8 shows in a table form standard information assigned by the procedure of FIG. 7;

FIG. 9 shows in a table form an example of table specifications produced with the standard information listed in FIG. 8;

FIG. 10 shows in a table form an example in which standard names are assigned to all data items listed in FIG. 6;

FIG. 11 shows in a table form table specifications produced with the standard information listed in FIG. 10;

FIG. 12 shows in a table form an example of program specifications produced with the standard information listed in FIG. 10;

FIG. 14 shows the result of standardization for the software product illustrated in FIG. 4.

DESCRIPTION OF THE PREFERRED EMBODIMENTS

The present invention will hereinafter be described in connection with embodiments thereof with reference to the accompanying drawings.

Figure 1:
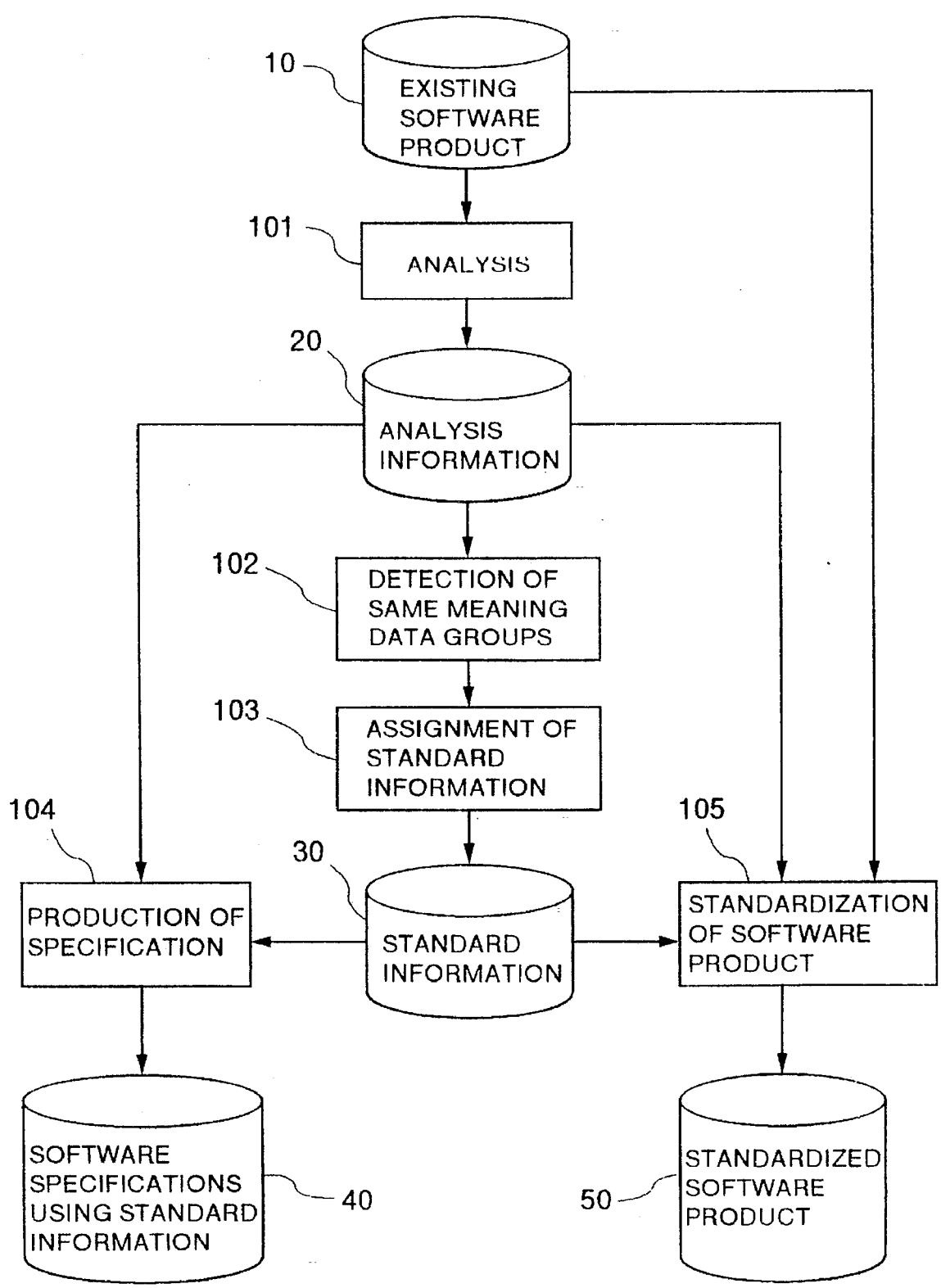
FIG. 1 is a conceptual diagram showing a software reuse method according to the present invention.

FIG. 1 is a conceptual diagram showing a method of producing software specifications and software products according to the present invention. In FIG. 1, an existing software product subjected to reuse is analyzed in processing step 101 to obtain analysis information 20. The existing software product here may be a source program, a job control program, or the like. With this analysis information 20, groups of data, or labels for accessing resources, such as files and data, in a computer, mutually having the same contents and thus identified as the same meaning data, are detected in processing step 102, and each of the groups of the same meaning data is assigned a standard data name or the standard data name and additional standard attributes, in processing step 103, to produce standard information 30.

When software specifications 40 are produced for the existing software product 10, in processing step 104, the analysis information 20 and the standard information 30 are inputted in order to convert names of data, belonging to respective groups of the same meaning data in the analysis information, into corresponding standard data names or the standard data names and additional standard attributes contained in the standard information 30, thus producing the software specifications 40 complying with the standard information 30. On the other hand, when the existing software product 10 is standardized, in processing step 105, the existing software product 10, the analysis information 20, and the standard information 30 are inputted likewise in order to replace data in the existing software product 10 with standard information to produce a standardized software product 50.

Figure 2:
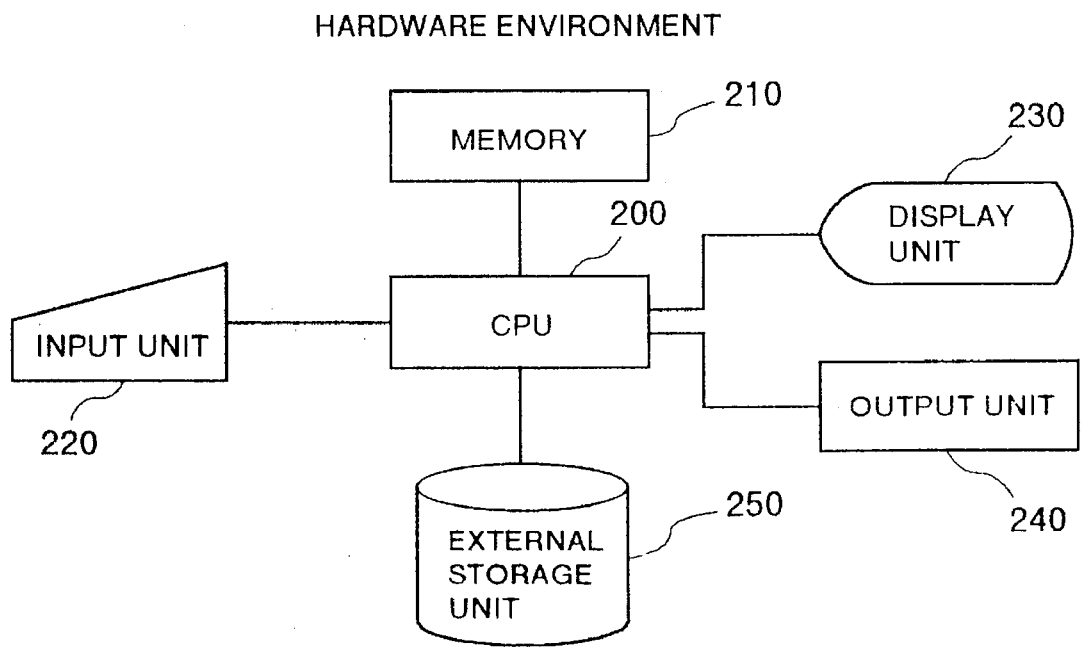
FIG. 2 is a block diagram showing hardware environment for realizing the present invention.

FIG. 2 shows in a block diagram for a simplified configuration of a hardware environment for implementing the method of present invention. A processing unit (CPU) 200 executes the processing step 101-105 identified in FIG. 1. A memory 210 contains processing programs for the CPU 200 and is also used as a work area for the CPU 200. An input unit 220, e.g., a keyboard, a mouse, or the like, is used by a user to input commands and data therefrom. A display unit 230, e.g., a CRT display unit or the like, is used for displaying data inputted from the input unit 220, the contents of processing under progress, guidance for the user, and so on. An output unit 240, e.g., a laser beam printer or the like, is used to print the contents of the existing software product 10, analysis information 20, standard information, standard software specifications 40 and standardized software product 50 shown in FIG. 1, if necessary. An external storage unit 250, which contains the existing software product 10 subjected to reuse, is also used to store the analysis information 20, standard information 30, standard software specifications 40, and standardized software product 50 as the processing results produced in the CPU 200.

Figure 3:
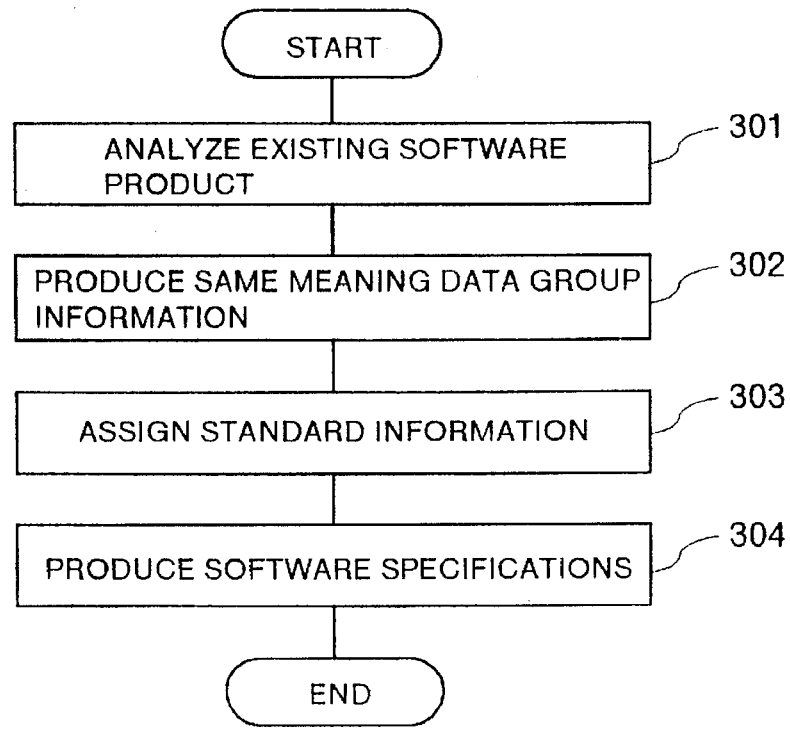
FIG. 3 is a flow diagram showing a processing procedure used by a first embodiment of the present invention.

FIG. 3 shows a processing procedure for producing standard software specifications according to the first embodiment of the present invention. The processing procedure will be specifically explained below with reference to FIG. 3.

<Analysis on Existing Software Product>

First, the CPU 200 analyzes the existing software product 10 stored in the external storage unit 250 (step 310).

The analysis on the existing software product is performed to extract information including used files, databases, screens, data, and so on depending on the kind of a software product to be reused. Extracted by analysis on a job control program is information such as the relation among a program name, a file allocation name, and a file name, and so on. Extracted by analysis on a source program are the relation among the source program, a file allocation name, a file name in the source program, and an input/output data name; the calling relation among programs, an argument name designated when calling a program; the contents of data definition; names of used databases; screen names; and so on.

Figure 4:
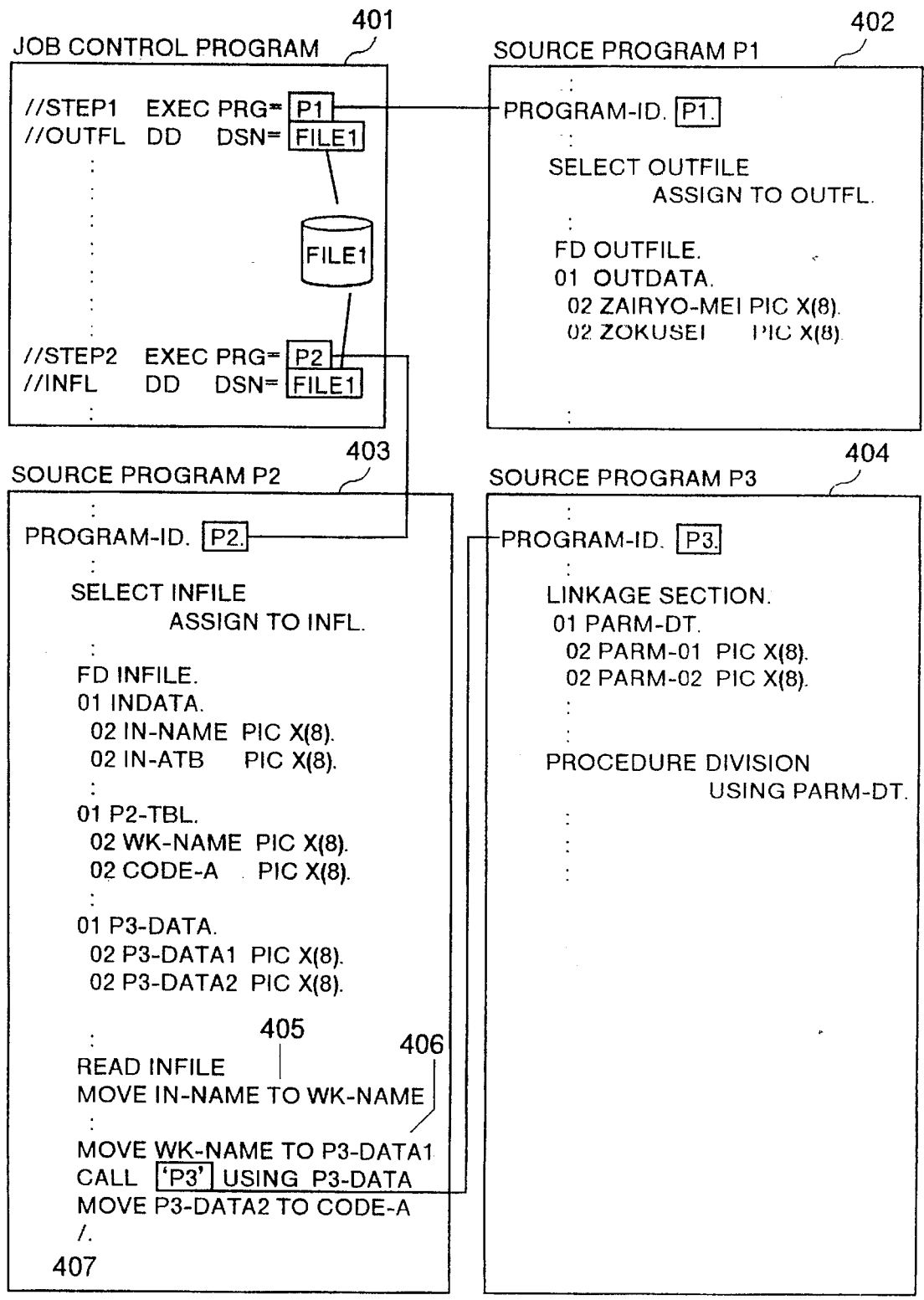
FIG. 4 shows an example of an existing software product.

FIG. 4 shows an example of an existing software product oriented to reuse. The reuse oriented software product shown in FIG. 4 includes a job control program 401 for defining processing procedures of a program, and source programs P1, P2, P3 (402–404) which describe the processing procedures in the program. According to the job control program 401, the program P1 is first started to produce a file FILE 1. Next, the program P2 is started to input the file FILE 1 and then call the program P3.

FIG. 5 shows an example of the results of the analysis on the software product illustrated in FIG. 4.

In the analysis on the job control program 401, the relation (501) among the program name P1, a file allocation name OUTFL, and the file name FILE 1, and the relation (502) among the program name P2, a file allocation name INFL, and the file name FILE 1 are extracted from the job control program 401.

In the analysis on the source programs P1, P2, P3, the relation (503) among the program name P1, a file allocation name OUTFL, a file name OUTFILE, and an input/output data name OUTDATA; the relation (504) among the program name P2, a file allocation name INFL, a file mane INFILE, and an input/output data name INDATA; the number and names of arguments (505, 506, 507) taken over when the programs P1, P2, P3 are called; the number and names of arguments or data items (508) taken over when the program P2 calls the program P3; and the contents (509–523) of definition of data used in the programs P1, P2, P3 are extracted from the source programs P1, P2, P3. As the contents of the data definition for group data, the name of the highest rank data above the group data and its position in the highest rank data are also extracted. The group data analysis information shown in FIG. 5 constitutes tables listing data items appearing in the source programs obtained as described above.

<Production of Same Meaning Data Group Information>

After analyzing a software product, the relation among data having the same meaning is analyzed to produce group information for same meaning data (step 302 in FIG. 3).

The same meaning refers to the relation among data or data items which have the same meaning and the same contents, irrespective of their names, and which may be determined that their names and attributes should be unified. The following cases may fall under the same meaning data:

(i) When a single file name appear a plurality of times during execution, the same file is used each time, so that input/output data for the same file are determined to have the same contents. This case is therefore regarded as the same meaning.

(ii) When data is transferred inside of a program, for example, by a MOVE statement in a source program described in the COBOL language or the like, data on the source side and data on the destination side have the same contents. Therefore, the data on the source and destination sides may be regarded as having the same meaning.

(iii) When data is taken over from a calling program to a called program, for example, data in a USING clause of a CALL statement and data in a USING clause of PROCEDURE DIVISION in a source program described in the COBOL language, are determined to have the same contents. Therefore, these data may be regarded as having the same meaning.

(iv) Further, when same meaning data are group data, lower rank data in the same meaning group data placed at the same location and having the same length may be determined to have the same contents.

The user is allowed to select which same meaning condition to use, and the order in which the same meaning data are analyzed may be arbitrarily specified. It should be noted that a method of extracting the same meaning relation of data is known and is described, for example, in JP-A-3-294925 entitled, "Software Standardizing Method".

FIG. 6 shows an example of same meaning data group information extracted from the results of the analysis on the software product illustrated in FIG. 5. The example of FIG. 6 shows that the same meaning data group information is produced by adding a same meaning data identifier to data determined to be of the same meaning.

It can be seen from the results (503, 503) of the analysis on the source programs in FIG. 5 that the file name OUTFILE (503) of the program P1 and the program name INFILE (504) of the program P2 have the file allocation names OUTFL, INFL, respectively. Examining file names based on the program names and the file allocation names in the results (501, 502) of the analysis on the job control program, which fall under the requirements of the same meaning, it is understood that the file name OUTFILE (503) corresponds to the file name FILE (501), while the file name INFILE (504) corresponds to the file name FILE1 (502), so that the file names OUTFILE and INFILE indicate the same file. It is therefore determined that the input/output data OUTDATA (503) and INDATA (504) of the respective programs P1, P2 are the same meaning data. Thus, OUTDATA and INDATA are equally assigned the same data identifier 001 and set to same meaning data group information (601, 602). Further, for lower rank data (509–514) of OUTDATA and INDATA, those positioned at the same location and having the same length are assigned the identical same meaning data identifier and set to the same meaning data group information (603, 604, 605, 606).

When files are used in programs, the above analysis is made on all files in all programs.

Next, data having data transfer relations are examined.

From MOVE statements (405, 406) in the program P2, it is determined that data IN-NAME and data WK-NAME have the same meaning; data WK-NAME and data P3-DATA1 have the same meaning; and IN-NAME, WK-NAME, and P3-DATA have the same meaning. In this event, since IN-NAME has been set to the same meaning data group information (604), WK-NAME and P3-DATA1 are set to the same meaning data group information (607, 608) using the same meaning identifier 002 already set for the IN-NAME.

As IN-NAME, WK-NAME, P3-DATA1 do not have lower rank data (513, 516, 519), no lower rank data is set to the same meaning data group information.

Since it is determined from a MOVE statement (407) in the program P2 that data P3-DATA2 and data CODE-A have the same meaning, they are assigned a same meaning data identifier 004 and set to the same meaning data group information (609, 610).

All programs are subjected to the examination of data transfer.

Next, arguments taken over when calling a program is examined.

When the program P3 is called from the program P2, data P3-DATA is taken over to PARM-DT (508, 507). Thus, P3-DATA and PARM-DT are determined to have the same meaning and accordingly assigned a same meaning identifier 005, thus producing the same meaning data group information (611, 612).

For lower rand data of P3-DATA and PARM-DT, those positioned at the same location and having the same length are determined to have the same meaning. Since P3-DATA1 has already been set to the same meaning data group information (608), the same meaning data identifier 002 assigned thereto is used to set PARM-01 to the same meaning data group information (613).

Also, since P3-DATA and PARM-02 are positioned at the same location and have the same length, they are determined to have the same meaning. P3-DATA2 has already been set to the same meaning data group information (609), so that the same meaning data identifier 004 assigned thereto is used to set PARM-02 to the same meaning data group information (614).

After all data have been examined whether they fall under the conditions of the same meaning, if data P2-TBL, for which any same meaning relation has not been detected, is also standardized, P2-TBL is assigned a different same meaning data identifier and set to the same meaning data group information (615).

In this embodiment, data items and records (groups of data items) described in the COBOL language have been examined as data for which the same meaning relations are extracted. In addition to the data items and records, the same meaning relations can be extracted for files, databases, screens, and so on.

<Assignment of Standard Information>

After producing the same meaning data group information, standard names and standard attributes are assigned to the same meaning data group information (step 303 in FIG. 3).

The assignment of a standard name is carried out in the following manner. First, a plurality of data names having the identical same meaning data identifier are displayed on the display unit (230). Then, the user inputs through the input unit (220) an item number of a data item name to be used as standard or a name determined by the user. In this event, the attributes of each data may also be displayed so as to allow the user to determine standard attributes as well as the data name.

FIGS. 7A and 7B each show an exemplary procedure for assigning a Standard name to the same meaning data group information of FIG. 6, and FIG. 8 shows an example of standard information assigned by the procedure of FIG. 7.

Referring to FIG. 7A, for assigning a standard name to the same meaning data group information (603, 604, 607, 608, 613) identified by the same meaning data identifier 002, "1" inputted by the user causes the data name ZAIRYO-MEI corresponding to the item number 1 to be designated as the standard name (801, 802, 803, 804, 807).

Referring next to FIG. 7B, for assigning a standard name to the same meaning data group information (609, 610, 614) identified by the same meaning data identifier 004, the standard name is determined by the user directly inputting the standard name ZAIRYO-CODE (805, 806, 808).

The same meaning data group information with other identifiers may also be assigned a standard name, as required, in a similar procedure.

FIG. 8 shows a table where the standard names assigned as illustrated in FIGS. 7A, 7B are added to the corresponding same meaning data group information in the table of FIG. 6.

<Production of Software Specifications>

After standard information has been assigned to the same meaning data group information, software specifications are produced (step 304 in FIG. 3). The production of software specifications according to this embodiment will be explained below in connection with table specifications and program specifications.

(1) Production of Table Specifications

The table specifications are produced by using a data name designated by the user as a table name, extracting definition information on lower rank data of the data designated by the user, when it is supposed to be the highest rank data, in the defining order, extracting the standard information of the same meaning data group information containing respective data, and converting the extracted standard information into a table specifications format. Stated another way, the table specifications are a combination of tables which are generally based on the tables as shown in FIG. 5.

When table specifications are produced, whether all data in designated tables have been standardized is optional, and existing information may also be used for data to which standard information is not assigned.

Even if all data have been standardized, existing data may be used by a command of user for instructing whether the standard information is used or not.

Names which may be designated as table names are data names directly described in source programs, part names which are fetched when a source program is interpreted, for example, the name of original data to be copied by a COPY statement, when described in the COBOL language, and so on.

When a data name corresponding to a table name has been standardized, the standard data name may be designated to produce single standard table specifications for a plurality of existing tables.

FIG. 9 shows examples of table specifications for OUT-DATA appearing in the program P1; INDATA, P2-TBL and P3-DATA in the program P2; and PARM-DT in the program P3 which were produced on the basis of the group data analysis information shown in FIG. 5 and the standard information shown in FIG. 8. Stated another way, FIG. 9 is composed of tables for data items which are represented in a different form based on the table listing data items appearing in the source programs.

Referring first toga table for OUTDATA in the program P1, data placed under the highest rank data name OUTDATA include OUTDATA (509), ZAIRYO-MEI (510), and ZOKUSEI (511), which are extracted in order from the table of FIG. 5. Among these data, since OUTDATA has not been standardized in FIG. 8, it is set in the table specifications as it is (901). Conversely, since ZAIRYO-MEI has been assigned the standard name ZAIRYO-MEI in FIG. 8 (801), this standard name is set in the table specifications (902). ZOKUSEI is set in the table specifications as it is (903) because it has not been standardized in FIG. 8.

Next, in a table for INDATA in the program P2, data placed under the highest rand data name INDATA include INDATA (512), IN-NAME (513), and IN-TAB (514), which are extracted in order from the table of FIG. 5. Among these data, since INDATA has not been standardized in FIG. 8, it is set in the table specifications as it is (904). Conversely, since IN-NAME has been assigned the standard name ZAIRYO-MEI in FIG. 8, this standard name is set in the table specification (905). Since IN-ATB has not either been standardized in FIG. 8, it is see in the table specifications as it is (906).

By a similar procedure, table specifications for P2-TBL (97, 908, 909), P3-DATA (910, 911, 912), and PARM-DT (913, 914, 915) are produced.

In FIG. 9, since the table names have not been standardized, table specifications are made for each table. An example of table specifications will next be shown for the case where the table names have also been standardized.

FIG. 10 shows an example of standard names which are assigned when the data in FIG. 8 have all been standardized. The procedure for assigning a standard name is similar to that explained in connection with FIGS. 7A, 7B.

In FIG. 10, table names OUTDATA and INDATA have been replaced by a standard name ZAIRYO-DATA (1001, 1002), and P3-DATA and PARM-DT have been replaced by a standard name P3-PARM (1005, 1006), so that table specifications are produced for the table names ZAIRYO-DATA, P2-TBL, and P3-PARM.

FIG. 11 shows an example of table specifications which are produced with the analysis results in FIG. 5 and the standard information in FIG. 10.

As the first data in a table ZAIRYO-DATA, the standard name ZAIRYO-DATA which has been substituted for OUT- DATA (1001) and INDATA (1002) is set in the table specifications (1101). Next, a standard name ZAIRYO-NAME substituted-for ZAIRYO-MEI (510, 801) and IN-NAME (513, 802), which are lower rank data of OUT-DATA and INDATA, is set in the table specifications (1102). Further, a standard name ZOKUSEI substituted for ZOKUSEI (511, 1003) and IN-ATB (514, 1004), which are next lower rank data below OUTDATA and INDATA, is set in the table specifications (1103). In this manner, a plurality of group data having the same standard data name are unified in one table, and converted into the table specifications.

A table P2-TBL is produced from P2-TBL in the program P2 by a procedure similar to that used to produce the table specifications of FIG. 9 (1107, 1108, 1109).

A table P3-PARM is produced by a procedure similar to that used to produce the table ZAIRYO-DATA (1107, 1108, 1109).

(2) Production of Program Specifications

Generally, program specifications describe input/output information such as files, database, screens, tables and so on used in the program; call formats for calling the program; summary of functions provided by the program; and so on.

When the user designates a program name, information associated with the program such as files, databases, screens, tables, arguments taken over when the program is called, and so on are extracted from program analysis information. If same meaning data group information is found in extracted data, standard information in the same meaning data group information is converted into a program specification format to produce the program specifications.

If non-standardized data exists or if the user instructs not to use the standard information, existing data information may be used similarly to the production of the table specifications.

FIG. 12 shows an example of program specifications produced for the program P2, which use the analysis results and the standard information illustrated in FIG. 5 and FIG. 10, respectively.

Since no parameter is taken over to the program P2 when it is called (506), the fact that no parameter is taken over is set in the program specifications (1201). The file INFILE (504) used in the program P2 has a record INDATA which has been assigned the standard name ZAIRYO-DATA (1002), so that this standard name ZAIRYO-DATA is set in the program specifications as the record name of the file (1202). While tables used in the program P2 are P2-TBL and P3-DATA (515, 518), they have been assigned the standard names P2-TBL and P3-PARM, respectively (1007, 1005), these standard names P2-TBL and P3-PARM are set in the program specifications as the table names (1203). When the program P3 is called from the program P2, P3-DATA is used as an argument (508). Since P3-DATA has been assigned the standard name P3-PARM (1005), this P3-PARM is set in the program specifications as an argument taken over when the program P3 is called from the program P2 (1204).

As described above, in the first embodiment of the present invention, the table specifications and program specifications have been produced. In addition, database specifications, screen specifications, screen transition specifications, and so on may also be produced as software specifications.

Next, a second embodiment of the present invention will be described. The second embodiment provides improvements on the first embodiment, which realizes the production of software specifications using standard information, and enables data in a software product as well to be replaced by standard information.

Figure 13:
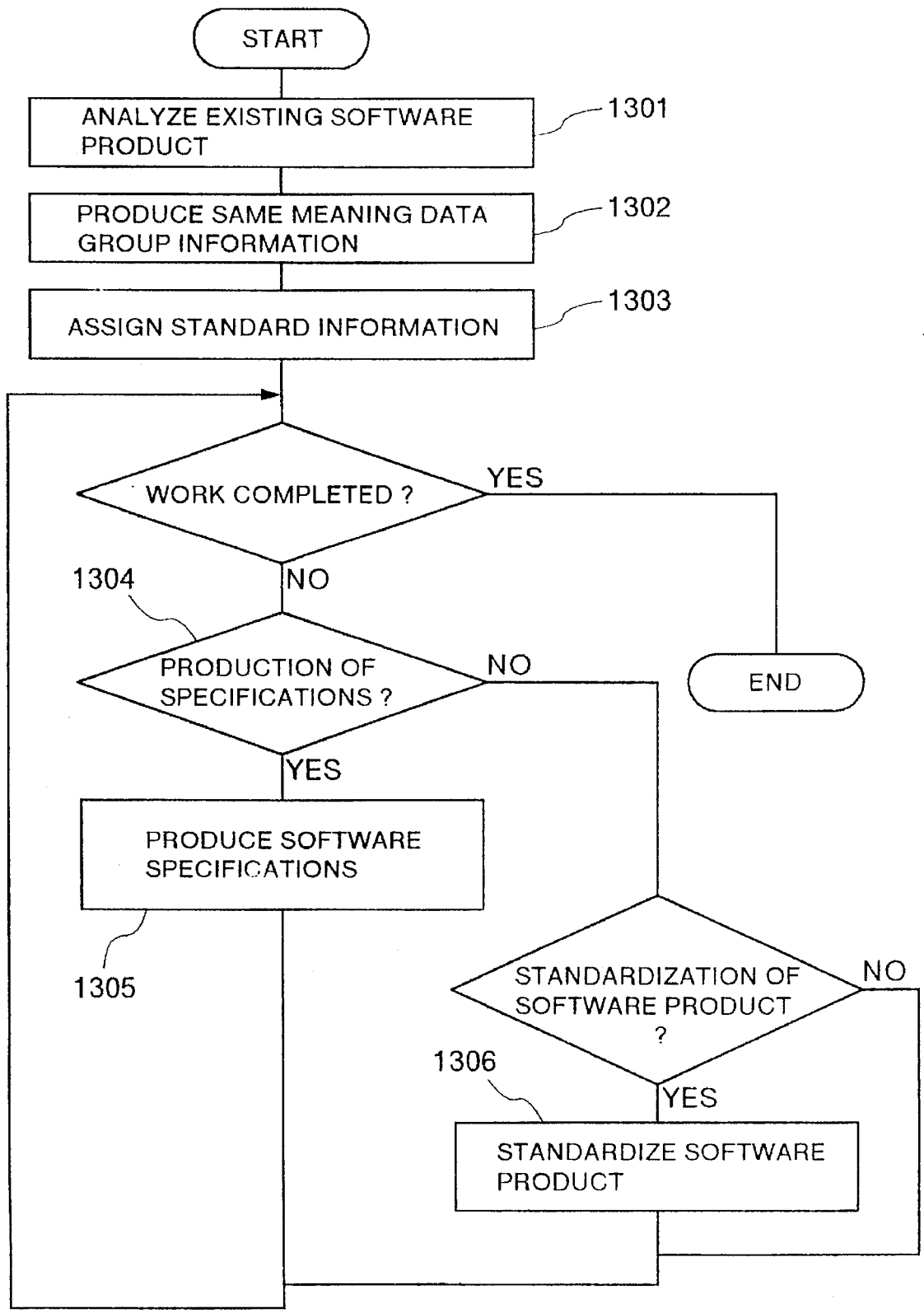
FIG. 13 is a flow diagram showing a processing procedure used by second embodiment of the present invention.

FIG. 13 shows in a block diagram form a processing procedure according to the second embodiment of the present invention. In FIG. 13, analysis on an existing software product (step 1301), production of same meaning data group information (step 1302), assignment of standard information (step 1303) correspond to steps 301, 303, 303 in FIG. 3, respectively, and are the same steps executed in the first embodiment. After standard information has been assigned, the user select (step 1304) one from production of software specifications (step 1305) and standardization of the software product (step 1306). After executing one, it is also possible to select the other one. The order of executing both may be arbitrarily determined. The production of software specifications (step 1305) corresponds to step 304 in FIG. 3 and is the same step executed in the first embodiment. Therefore, the standardization of a software product (step 1306) will be particularly explained below.

<Standardization of Software Product>

If standard names have been assigned to data information in the results of analysis on a software product, the software product may be standardized by replacing names of data or data items in the software product by the standard information.

FIG. 14 shows an example where data names in the source programs P1, P2, P3 of FIG. 4 are replaced by the standard information listed in FIG. 10. OUTDATA in the program P1 and INDATA in the program P2, including those positioned as lower rank data of group data, are replaced by the standard data name ZAIRYO-DATA. P2-TBL in the program P2, including that positioned as lower rank data of group data, is replaced by the standard data name P2-TBL. P3-DATA in the program P2 and PARMDATA in the program P3, including those positioned as lower rank data of group data, are replaced by the standard data name P3-PARM. Not only in data definition, data names in execution statements are all replaced by corresponding standard data names.

According to the present invention, in works for reusing existing software products for developing new software products, when a software product is standardized and converted into specifications, the specifications are directly produced from standard data without replacing data in the software product into the standard data, thus enabling the specifications to be produced using the standard data in a higher efficiency.

Also, as a production unit of the software specifications, a standardized data unit is used for producing the software specifications, without using the existing software product as the production unit, so that the amount of produced specifications are reduced, and necessary specifications can be efficiently produced.

Further, by replacing data in existing software products by standard information, standardized software products can also be produced in an efficient manner, in addition to the production of the software specifications.

We claim:

1. A method of producing software specifications, comprising the steps of:

analyzing an existing software product;

detecting groups of data which mutually have like contents to identify said groups as same meaning data groups;

determining a standard data name for each of said same meaning data groups;

extracting information as to software specifications of said existing software product from analysis information of said software product, by replacing names of data belonging to said groups of same meaning data in said software product with said determined standard data names; and producing standardized software specifications of said existing software product from said extracted information.

2. A method of producing software specifications according to claim 1, wherein said software product is at least one of a source program and a job control program.

3. An apparatus for producing software specifications said apparatus comprising:

means for analyzing a source program to produce a table which lists data items appearing in said source program;

means for extracting, from said data items in said table, groups of data items which are determined as being identical irrespective of their names;

means for assigning a designated standard data name to each of said groups of data items; and means for producing table specifications based on said table, said table specifications being extracted as a result of a conversion to the standard data names assigned to said groups of data items.

4. An apparatus for producing software specifications according to claim 3, wherein said second table, in which data names are converted into said standard data names, has a plurality of group data having the same standard data name unified into one data item.

5. A method of automatically producing specifications for computer software in accordance with a source program of said computer software, wherein said computer software instructs a computer to access resources related to labels written in said source program, said method comprising the steps of:

storing said source program in a memory;

extracting said labels related to one of said resources from said source program in said memory;

determining a common label common to said extracted labels;

substituting said common label for said labels in said memory, wherein each of said labels corresponds to respective ones of said extracted labels;

repeating said extracting, determining, and substituting steps with respect to said source program in said memory to convert said source program in said memory to a software specification written by said common labels; and outputting said software specification to an output device.

6. An apparatus for automatically producing specifications of computer software in accordance with a source program of said computer software, wherein said computer software instructs a computer to access resources which are related to labels written in said source program, said apparatus comprising:

an output device;

means for storing said source program;

means for extracting said labels which are related to one of said resources, from said source program in said storing means;

means for determining a common label common to said extracted labels;

means for substituting said common label for said labels in said storing means, wherein each of said labels corresponds to respective ones of said extracted labels;

means for operating said extracting, determining, and substituting steps with respect to said source program in said storing means so as to convert said source program in said storing means into a software specification written by said common labels;

means for outputting said software specification to said output device.

7. A computer program product for use with a computer having a display device, comprising:

a computer readable medium with a computer program recorded thereon, the program including:

a first code section for causing the computer to analyze a source program to produce a first table which lists data items appearing in said source program;

a second code section for causing the computer to extract, from said data items in said first table, groups of data items which are determined as being identical irrespective of their names;

a third code section for causing the computer to assign a designated standard data name to each of said groups of data items; and a fourth code section for causing the computer to produce a second table based on said first table, said second table including said groups of data items, names of which have been converted to said standard data names assigned to said groups of data items.

8. A computer program product for use with a computer having a display device, comprising:

a computer readable medium with a computer program recorded thereon, the program including:

a first code section for causing the computer to store a source program;

a second code section for causing the computer to extract labels written in said source program which are related to one of a plurality of resources related to the labels written in said source program, from said source program in a storing means;

a third code section for causing the computer to determine a common label common to said extracted labels;

a fourth code section for causing the computer to substitute said common label for said labels in said storing means, wherein each of said labels corresponds to respective ones of said extracted labels;

a fifth code section for causing the computer to operate said extracting, determining, and substituting means with respective to said source program in said storing means so as to convert said source program in said storing means into a software specification written by said common labels; and a sixth code section for causing the computer to output said software specification to an output device.

9. A method for producing software specifications according to claim 1, wherein said standardized software specifications being produced are standardized table specifications.

10. A method for producing software specifications according to claim 1, wherein said standardized software specifications being produced are standardized program specifications.

* * * * *